US012761683B2

(12) United States Patent
Hiraoka

(10) Patent No.: US 12,761,683 B2
(45) Date of Patent: Oct. 13, 2026

(54) CURRENT COMPENSATION CIRCUIT AND SEMICONDUCTOR DEVICE

(71) Applicant: ABLIC Inc., Nagano (JP)

(72) Inventor: Naohiro Hiraoka, Nagano (JP)

(73) Assignee: ABLIC Inc., Nagano (JP)

( * ) Notice: Subject to any disclaimer, the term of this patent is extended or adjusted under 35 U.S.C. 154(b) by 44 days.

(21) Appl. No.: 19/091,792

(22) Filed: Mar. 26, 2025

(65) Prior Publication Data

US 2025/0306623 A1 Oct. 2, 2025

(30) Foreign Application Priority Data

Mar. 29, 2024 (JP) ................................. 2024-055734
Nov. 12, 2024 (JP) ................................. 2024-197461

(51) Int. Cl.
*G05F 3/26* (2006.01)

(52) U.S. Cl.
CPC .................................... *G05F 3/267* (2013.01)

(58) Field of Classification Search
CPC . G05F 3/30; G05F 3/242; G05F 3/245; G05F 3/267; G05F 3/222; G05F 3/02; G05F 1/10; G05F 3/26; G05F 1/567; H03K 17/14
See application file for complete search history.

(56) References Cited

U.S. PATENT DOCUMENTS 5,038,053 A * 8/1991 Djenguerian ........... G05F 3/267 327/540
6,724,244 B2 * 4/2004 Wu ......................... G05F 3/262 327/543
2009/0224804 A1 9/2009 Noda
2020/0218302 A1 * 7/2020 Brule ..................... G01R 19/32
2022/0057825 A1 * 2/2022 Shiina ..................... G05F 3/265

FOREIGN PATENT DOCUMENTS

JP 2009044297 2/2009

* cited by examiner

*Primary Examiner* — Tuan T Lam
(74) *Attorney, Agent, or Firm* — JCIPRNET

(57) ABSTRACT

A current compensation circuit includes: a second bipolar transistor configured to have a same process variation as the first bipolar transistor; a first transistor including a drain connected to the emitter of the second bipolar transistor; a second transistor including a gate connected to a gate of the first transistor, and a drain connected to its own gate; a third transistor including a drain connected to the emitter of the first bipolar transistor, and a gate connected to the drain of the second transistor and each gate of the first and the second transistors; a constant current source; a fourth transistor including a drain connected to the base of the second bipolar transistor, and a gate connected to its own drain; and a fifth transistor including a drain connected to one end of the constant current source, and a gate connected to the gate of the fourth transistor.

16 Claims, 6 Drawing Sheets

CURRENT COMPENSATION CIRCUIT AND SEMICONDUCTOR DEVICE

CROSS-REFERENCE TO RELATED APPLICATION

This application claims the priority benefits of Japanese application no. 2024-055734, filed on Mar. 29, 2024 and Japanese application no. 2024-197461, filed on Nov. 12, 2024. The entirety of the above-mentioned patent application is hereby incorporated by reference herein and made a part of this specification.

BACKGROUND

Technical Field

The present invention relates to a current compensation circuit and a semiconductor device.

Related Art

A voltage Vbe of a base-emitter diode of a parasitic bipolar transistor formed in a CMOS process may be expressed using the Boltzmann constant k, absolute temperature T, electron charge q, collector current Ic, reverse saturation current Is, and natural logarithm ln, as described in the following equation (1)

$$Vbe = (kT/q)\times \ln(Ic/Is) \tag{1}$$

The voltage Vbe is utilized, for example, as information for converting to absolute temperature T.

As described in the above equation (1), since the voltage Vbe is a function of the collector current Ic, in order to reduce process variations in the voltage Vbe, it is necessary to keep the collector current Ic constant. However, in the parasitic bipolar transistor, since the collector terminal is the substrate, it is not possible to directly flow a constant current from the collector terminal to the parasitic bipolar transistor. Thus, as an alternative, a constant current is directly flowed to the parasitic bipolar transistor from the emitter terminal.

In the case where $h_{FE}$, the current gain, in emitter-grounded configuration is sufficiently large, an emitter current Ie becomes almost equal to the collector current Ic (Ie≈Ic). Thus, by keeping the emitter current Ie constant, it is possible to reduce the influence of process variations on the voltage Vbe, as an alternative to keeping the collector current Ic constant.

However, in the case of a parasitic bipolar transistor, since $h_{FE}$ is relatively small, unlike the case where $h_{FE}$ is sufficiently large, the magnitude of the base current Ib that branches from the emitter terminal to the base terminal cannot be ignored. In short, for the voltage Vbe of the base-emitter diode of the parasitic bipolar transistor, keeping the emitter current Ie constant cannot be substituted for keeping the collector current Ic constant. Thus, for the voltage Vbe of the base-emitter diode of a bipolar transistor with a small $h_{FE}$, such as a parasitic bipolar transistor, a new technique is required as an alternative to keeping the emitter current Ie constant.

SUMMARY

The present invention provides a current compensation circuit and a semiconductor device configured to keep a constant collector current of a bipolar transistor regardless of the magnitude of the current gain in emitter-grounded configuration.

A current compensation circuit according to one aspect of the present invention is a circuit configured to supply current to an emitter of a first bipolar transistor including a collector connected to a first power terminal, a base connected to the first power terminal, and the emitter. The current compensation circuit includes: a second bipolar transistor including a collector connected to the first power terminal, a base, and an emitter, and that is configured to have a same process variation as the first bipolar transistor; a first transistor that includes a drain connected to the emitter of the second bipolar transistor, a gate, and a source connected to a second power terminal; a second transistor including a gate connected to the gate of the first transistor, a drain connected to the gate of the second transistor, and a source connected to the second power terminal; a third transistor including a drain connected to the emitter of the first bipolar transistor, a gate connected to a connection point of the drain of the second transistor, the gate of the second transistor, and the gate of the first transistor, and a source connected to the second power terminal; a constant current source including a first end connected to the connection point and a second end connected to the first power terminal; a fourth transistor including a drain connected to the base of the second bipolar transistor, a source connected to the first power terminal, and a gate connected to the drain of the fourth transistor; and a fifth transistor including a drain connected to the first end of the constant current source, a gate connected to the gate of the fourth transistor, and a source connected to the first power terminal.

According to the present invention, it is possible to keep a constant collector current of a bipolar transistor regardless of the magnitude of the current gain in emitter-grounded configuration.

DESCRIPTION OF THE EMBODIMENT

The current compensation circuit and semiconductor device according to the embodiments of the present invention will be described below based on the attached drawings.

First Embodiment

Figure 1:
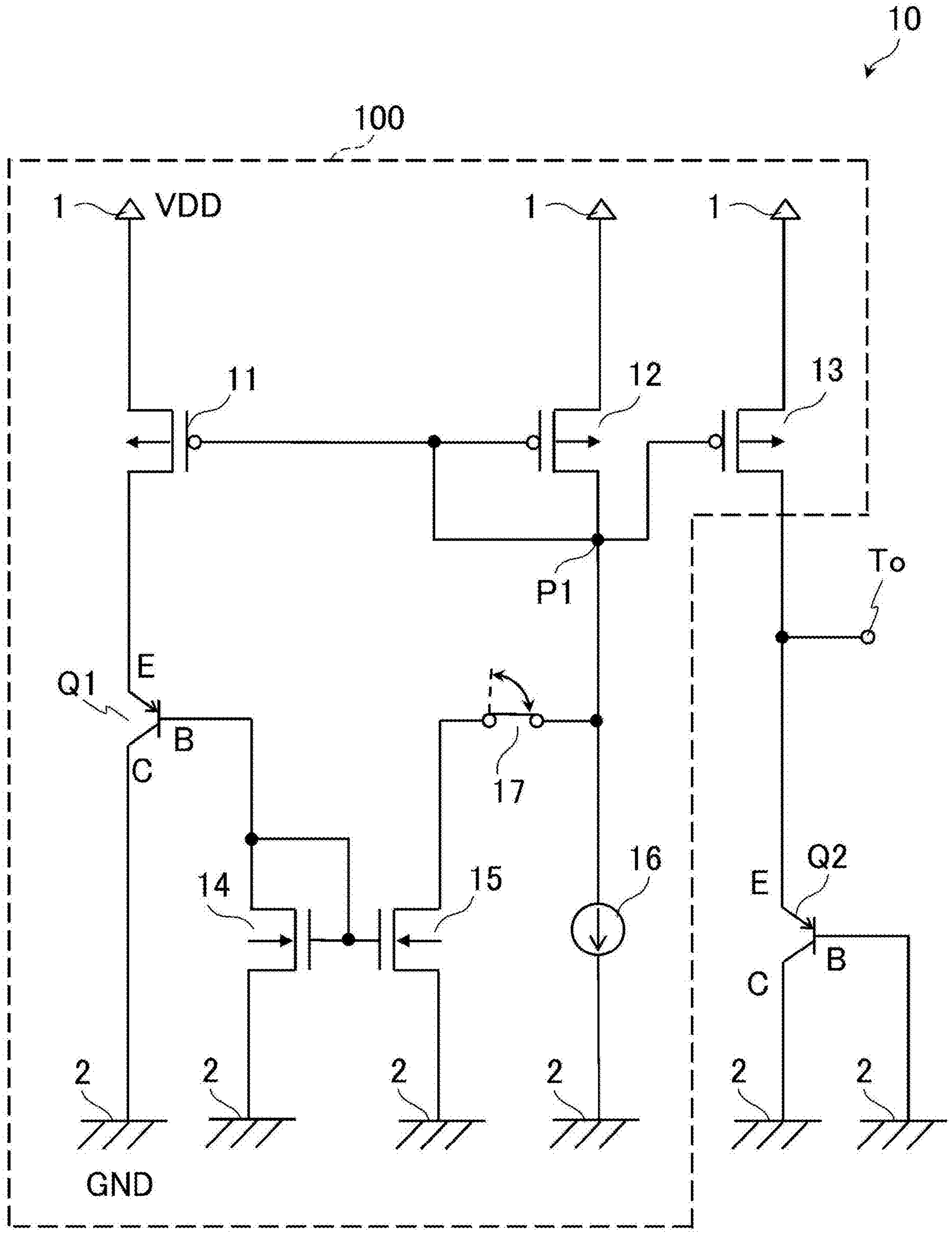
FIG. 1 is a circuit diagram illustrating a configuration example of a current compensation circuit and a semiconductor device according to the first embodiment of the present invention.

FIG. 1 is a circuit diagram of a current compensation circuit 100 and a semiconductor device 10 which are examples of the current compensation circuit and semiconductor device according to the first embodiment of the present invention.

The semiconductor device 10 includes an integrated circuit (IC) integrated on a semiconductor substrate, and includes, for example, a transistor Q2 which is a parasitic bipolar transistor formed in a CMOS process, a current compensation circuit 100 that supplies a compensated current to an emitter E of the transistor Q2, and an output terminal To connected to the emitter E of the transistor Q2 serving as a first bipolar transistor. The transistor Q2 includes its collector C and base B connected to a GND terminal 2 serving as a power terminal to supply a ground voltage.

The current compensation circuit 100 includes, for example, PMOS transistors 11, 12, 13, NMOS transistors 14, 15, a constant current source 16, a switch 17, and a transistor Q1 serving as a second bipolar transistor. The transistor Q1 is a bipolar transistor configured to have the same process variation as the transistor Q2.

The PMOS transistor 11, serving as a first transistor, includes a drain connected to an emitter E of the transistor Q1, a gate, and a source connected to a VDD terminal 1 serving as a power terminal to supply a power supply voltage different from the ground voltage. The PMOS transistor 12, serving as a second transistor, includes a gate connected to a gate of the PMOS transistor 11, a drain connected to the gate of the PMOS transistor 12, and a source connected to the VDD terminal 1. The PMOS transistor 13, serving as a third transistor, includes a drain connected to the emitter E of the transistor Q2; a gate connected to a connection point P1 of the gate of the PMOS transistor 11, and of the gate and drain of the PMOS transistor 12; and a source connected to the VDD terminal 1. In other words, the PMOS transistors 11, 12, 13 constitute a current mirror circuit which replicates the drain current of the PMOS transistor 12 and supplies drain currents from the PMOS transistor 11 and the PMOS transistor 13.

The NMOS transistor 14, serving as a fourth transistor, includes a drain connected to a base B of the transistor Q1, a source connected to the GND terminal 2, and a gate connected to its own drain. The NMOS transistor 15, serving as a fifth transistor, includes a drain connected to the connection point P1 through the switch 17, a gate connected to the gate and drain of the NMOS transistor 14, and a source connected to the GND terminal 2. The constant current source 16 includes a first end connected to the connection point P1 and a second end connected to the GND terminal 2. The switch 17 is connected between the connection point P1 and the drain of the NMOS transistor 15, and is capable of switching between a conduction state and an open state, that is, it may be opened and closed.

The operation of the current compensation circuit 100 and the semiconductor device 10 will now be described.

In the current compensation circuit 100 and the semiconductor device 10 configured as described above, the transistor Q1 functions as a dummy transistor which simulates the transistor Q2, as it is configured to have the same process variation as the transistor Q2. Thus, based on the base current branching from the base B of the transistor Q1, a compensation current is generated to compensate for the base current branching from the base B of the transistor Q2.

The generated compensation current is added to the constant current sunk by the constant current source 16 at the node of the connection point P1 through the NMOS transistor 14 and the NMOS transistor 15, which constitute a current mirror circuit, and the switch 17. The current, which is the sum of the constant current and the compensation current, is supplied to the emitter E of the transistor Q2 through the PMOS transistor 12 and the PMOS transistor 13.

In the current compensation circuit 100 and the semiconductor device 10 operating as described above, the current supplied to the emitter E of the transistor Q2 becomes the sum of the compensation current and the constant current from the constant current source 16. Thus, a collector current Ic flowing through the collector C of the transistor Q2 is determined by a current value of the constant current source 16, regardless of whether the base current branching from the base B of the transistor Q2 is negligible or not in magnitude. Consequently, if the current value of the constant current source 16 may be accurately determined, a highly accurate collector current Ic can be obtained.

The accuracy of the current value of the constant current source 16 can be ensured, for example, by trimming during pre-shipment inspection. It should be noted that during trimming, the compensation current is unnecessary, so the switch 17 is opened. In other words, the drain of the NMOS transistor 15 is electrically disconnected from the connection point P1. On the other hand, after the trimming is completed, the switch 17 is shorted, and the drain of the NMOS transistor 15 and the connection point P1 are connected in a conductive state.

According to the current compensation circuit 100 and the semiconductor device 10, even if an $h_{FE}$ of the transistor Q2 has process variation, the collector current Ic may be kept constant regardless of the magnitude of $h_{FE}$. Thus, the current compensation circuit 100 and the semiconductor device 10 can prevent the occurrence of process variation in the collector current Ic generated in conventional devices to maintain a constant emitter current Ie, and consequently, the variation in the voltage Vbe of the base-emitter diode due to $h_{FE}$. As a result, it is possible to cancel out the variation in the voltage Vbe of the base-emitter diode caused by $h_{FE}$. The current compensation circuit 100 and the semiconductor device 10 are suitable for application in, for example, temperature sensors or BGR circuits that obtain accurate temperature (absolute temperature T) based on the voltage Vbe of the base-emitter diode obtained from the aforementioned equation (1).

Second Embodiment

Figure 2:
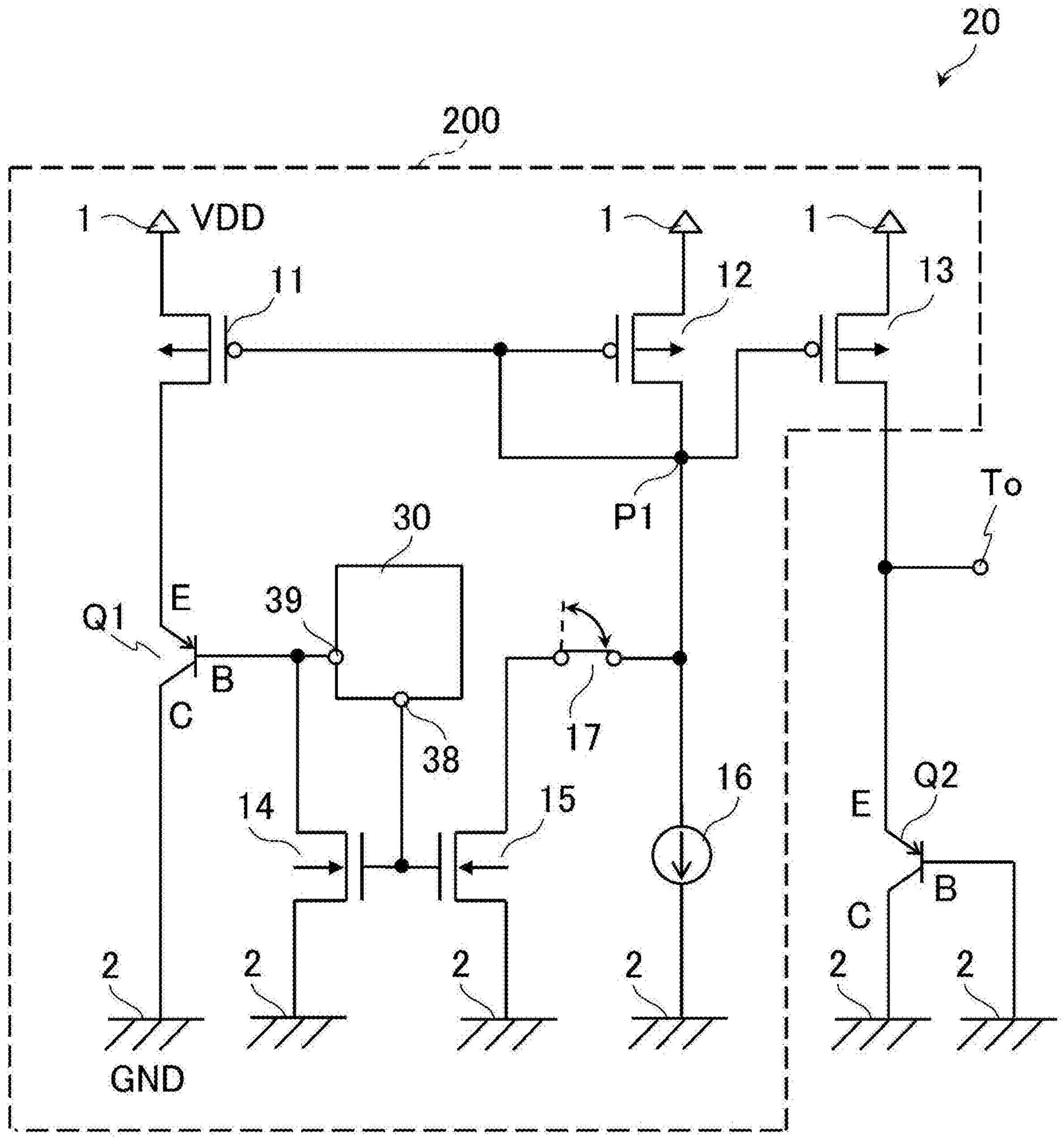
FIG. 2 is a circuit diagram illustrating a configuration example of a current compensation circuit and a semiconductor device according to the second embodiment of the present invention.

FIG. 2 is a circuit diagram of a current compensation circuit 200 and a semiconductor device 20 which are examples of a current compensation circuit and a semiconductor device according to the second embodiment of the present invention.

The semiconductor device 20 differs from the semiconductor device 10 in that it includes the current compensation circuit 200 instead of the current compensation circuit 100, but does not substantially differ in other aspects. The current compensation circuit 200 differs from the current compensation circuit 100 in that it further includes a voltage lowering circuit 30, but does not substantially differ in other aspects. Thus, in this embodiment, the description will focus on the constituent elements that differ from the semiconductor device 10 and the current compensation circuit 100, while the same reference numerals will be assigned to constituent elements that do not substantially differ from those described in the above-described embodiment, and redundant explanations will be omitted.

Compared to the current compensation circuit 100, the current compensation circuit 200 further includes a voltage lowering circuit 30 that lowers the potential of a base B of transistor Q1. The voltage lowering circuit 30 has a first end 38 connected to the gate of the NMOS transistor 14, and a second end 39 connected to the base B of the transistor Q1 and the drain of the NMOS transistor 14.

Figure 3:
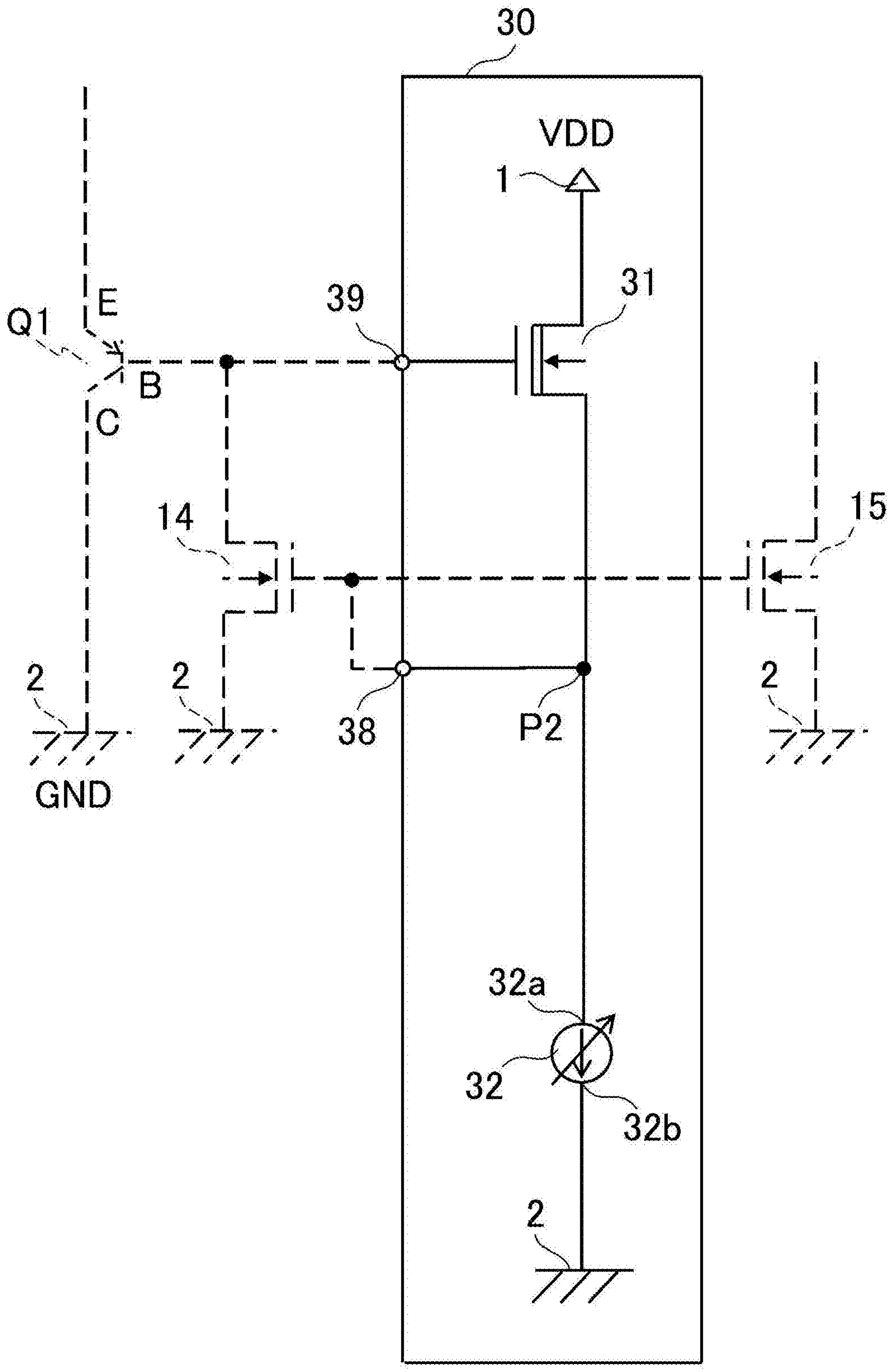
FIG. 3 is a circuit diagram illustrating a first configuration example of a voltage lowering circuit in the current compensation circuit and semiconductor device according to the second embodiment.

FIG. 3 is a circuit diagram illustrating a configuration example of the voltage lowering circuit 30 which is an example of a voltage lowering circuit in the current compensation circuit and semiconductor device according to the second embodiment.

The voltage lowering circuit 30 includes a depletion-type NMOS transistor (hereinafter referred to as "DNMOS transistor") 31 and a current adjustment circuit 32. The DNMOS transistor 31 includes a drain connected to the VDD terminal 1, a gate connected to the second end 39 of the voltage lowering circuit 30, and a source connected to the first end 38 of the voltage lowering circuit 30. Here, a connection point between the source of the DNMOS transistor 31 and the first end 38 of the voltage lowering circuit 30 is referred to as a connection point P2.

The current adjustment circuit 32 includes a first end 32*a* connected to the connection point between the source of the DNMOS transistor 31 and the first end 38 of the voltage lowering circuit 30, namely the connection point P2, and a second end 32*b* connected to the GND terminal 2, and is configured as a variable current source capable of adjusting the current value of the current flowing through the connection point P2.

Figure 4:
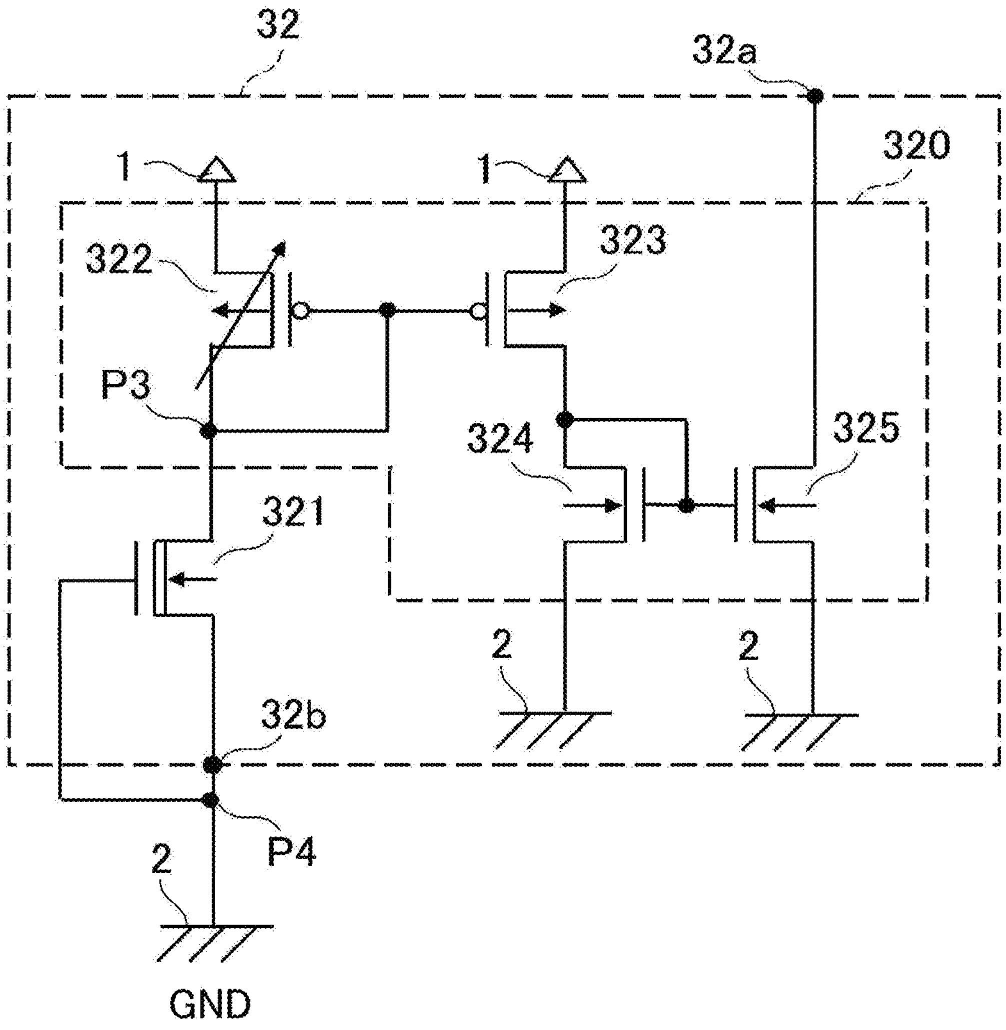
FIG. 4 is a circuit diagram illustrating a first configuration example of a current adjustment circuit in the voltage lowering circuit of the current compensation circuit and semiconductor device according to the second embodiment.
Figure 5:
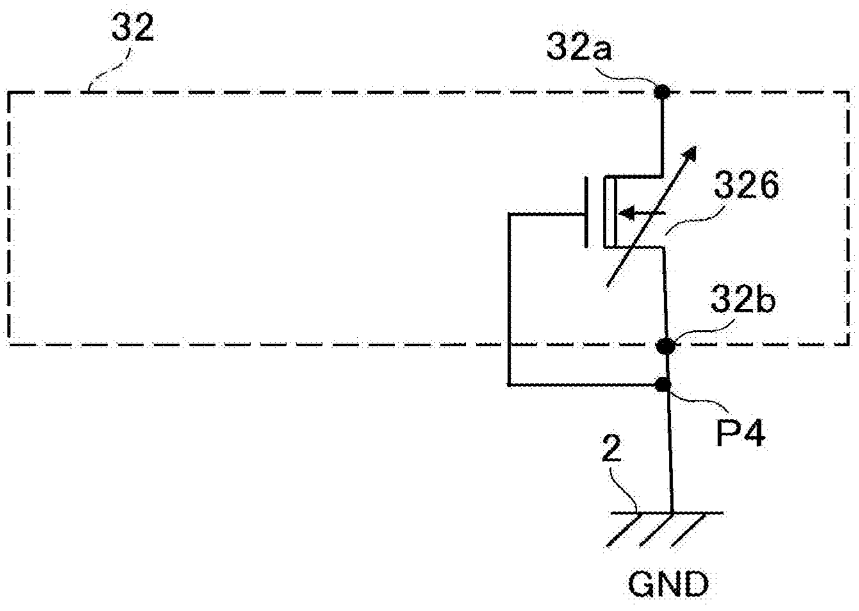
FIG. 5 is a circuit diagram illustrating a second configuration example of a voltage lowering circuit in the current compensation circuit and semiconductor device according to the second embodiment.

FIG. 4 and FIG. 5 are circuit diagrams illustrating a first configuration example and a second configuration example of the current adjustment circuit 32, respectively.

The current adjustment circuit 32 of the first configuration example (FIG. 4) includes a DNMOS transistor 321 with its gate and source connected to the GND terminal 2, and a current mirror circuit 320 having a first end connected to the drain of the DNMOS transistor 321 and a second end connected to the connection point P2. The DNMOS transistor 321 is configured to have the same process variation as the DNMOS transistor 31.

The current mirror circuit 320 includes PMOS transistors 322 and 323 constituting a first current mirror circuit, and NMOS transistors 324 and 325 constituting a second current mirror circuit. The first current mirror circuit and the second current mirror circuit are connected by connecting the drain of the PMOS transistor 323 and the drain of the NMOS transistor 324.

The current mirror circuit 320 is configured to be capable of adjusting an overall mirror ratio k (where k is a positive number) by including at least one transistor capable of adjusting drain current, such as the PMOS transistor 323, among the PMOS transistor 322, the PMOS transistor 323, the NMOS transistor 324, and the NMOS transistor 325 that constitute the current mirror circuit 320.

In the first current mirror circuit, the PMOS transistor 322 includes a drain connected to the drain of the DNMOS transistor 321, a gate connected to the drain of the PMOS transistor 322, and a source connected to the VDD terminal 1. The PMOS transistor 323 includes a source connected to the VDD terminal 1, a gate connected to the drain and gate of the DNMOS transistor 321, and a drain.

In the second current mirror circuit, the NMOS transistor 324 includes a drain connected to the drain of the PMOS transistor 323, a gate connected to the drain of the NMOS transistor 324, and a source connected to the GND terminal 2. The NMOS transistor 325 includes a drain connected to the connection point P2, a gate connected to the drain and gate of the NMOS transistor 324, and a source connected to the GND terminal 2.

Here, regarding the current mirror circuit 320, a connection point P3 where the gate and drain of the PMOS transistor 322 connect with the drain of the DNMOS transistor 321 corresponds to the first end of the current mirror circuit 320. The drain of the NMOS transistor 325, namely the connection point P2, corresponds to the second end of the current mirror circuit 320. Moreover, in the current adjustment circuit 32 of the first configuration example (FIG. 4), a node which is the same as the drain of the NMOS transistor 325 connected to the connection point P2 corresponds to the first end 32*a*, and a node which is the same as the connection point P4, which is the connection point of the gate and source of the DNMOS transistor 321, corresponds to the second end 32*b*.

The current adjustment circuit 32 of the second configuration example (FIG. 5) is configured to include a DNMOS transistor 326 with its gate and source connected and is capable of adjusting its drain current. In the current adjustment circuit 32 of the second configuration example (FIG. 5), a node which is the same as the drain of the DNMOS transistor 326 connected to the connection point P2 corresponds to the first end 32*a*, and a node which is the same as the connection point P4, which is the connection point of the gate and source of the DNMOS transistor 326, corresponds to the second end 32*b*.

Next, referring to FIG. 2 to FIG. 5, the operation of the current compensation circuit 200 and the semiconductor device 20 will be described.

In the current compensation circuit 200 and the semiconductor device 20 configured as described above, similar to the current compensation circuit 100 and the semiconductor device 10, a compensation current is generated based on the base current branching from the base B of the transistor Q1 to compensate for the base current branching from the base B of the transistor Q2. However, in the current compensation circuit 200, by adjusting the current value of the current adjustment circuit 32, it is possible to adjust a gate-source voltage Vgs 31 of the DNMOS transistor 31 to zero or less (Vgs 31≤0) while operating the NMOS transistor 14 and the NMOS transistor 15 as a current mirror circuit.

Thus, the current value of the current adjustment circuit 32 is adjusted such that the gate-source voltage Vgs 31 of the DNMOS transistor 31 becomes negative (Vgs 31<0). The current value of the current adjustment circuit 32 is adjusted, for example, by generating a reference current using the DNMOS transistor 321 operating as a constant current source, multiplying the generated reference current by a constant (1/k times in the example of FIG. 4) via the current mirror circuit 320, and outputting it to the drain of the NMOS transistor 325, namely the connection point P2.

By adjusting the current value of the current adjustment circuit 32, the voltage lowering circuit 30 supplies a voltage lower than the voltage of the first end 38 to the second end 39. The first end 38 is the same node as the source of the DNMOS transistor 31, and the second end 39 is the same node as the gate of the DNMOS transistor 31. In the case where k is other than 1 (k≠1), that is, in the case where the current value of the drain current of the PMOS transistor 322 is different from the current value of the drain current of the PMOS transistor 323, although the DNMOS transistor 31 has slight process dependence and temperature dependence, as long as the slight process dependence and temperature dependence of the DNMOS transistor 31 are within a range acceptable in the design, their effects may be ignored.

The current compensation circuit 200 and the semiconductor device 20, similar to the current compensation circuit 100 and the semiconductor device 10, are capable of keeping the collector current Ic constant regardless of the magnitude of $h_{FE}$, even if the $h_{FE}$ of transistor Q2 has process variations. Thus, variations in the base-emitter diode voltage Vbe due to $h_{FE}$ are not generated, and variations in the base-emitter diode voltage Vbe caused by $h_{FE}$ can be cancelled out.

Furthermore, in the current compensation circuit 200 and the semiconductor device 20, by adjusting the gate-source voltage Vgs 31 of the DNMOS transistor 31 to be negative, the potential of the base of transistor Q1 in the current compensation circuit 200 and the semiconductor device 20 may be lowered compared to before adjustment. In other words, the current compensation circuit 200 and the semiconductor device 20 are capable of lowering an operating point of transistor Q1 compared to an operating point of transistor Q1 in the current compensation circuit 100 and the semiconductor device 10 which do not include the voltage lowering circuit 30.

By lowering the operating point of transistor Q1, the voltage of the terminal connected to the source of the PMOS transistor 11, namely the voltage of the VDD terminal 1, may be lowered. Thus, the current compensation circuit 200 and the semiconductor device 20 may operate at a lower power supply voltage compared to conventional circuits and the current compensation circuit 100 and the semiconductor device 10 which do not include the voltage lowering circuit 30. In most cases, this benefit outweighs the disadvantage of the DNMOS transistor 31 having slight process dependence and temperature dependence, making it beneficial overall.

The present invention is not limited to the embodiments described above, and at the implementation stage, it may be implemented in various forms other than the examples described above, and various omissions, additions, substitutions, or modifications may be made within the scope of the invention without departing from the spirit of the invention. For example, the switch 17 may be omitted in cases where there is no need to separate the drain current of the NMOS transistor 15 from the drain current of the PMOS transistor 13, such as in the case where trimming of the current value of the constant current source 16 is complete or in the case where trimming is unnecessary due to sufficient accuracy of the collector current Ic.

Moreover, the configuration example capable of adjusting the current value of the current flowing through the connection point P2 is not limited to the voltage lowering circuit 30 having the current adjustment circuit 32 capable of adjusting the current value of the current flowing through the connection point P2. As another configuration capable of adjusting the current value of the current flowing through the connection point P2, for example, the DNMOS transistor 31 provided in the voltage lowering circuit 30 may be a voltage lowering circuit 30A (see FIG. 6) including a DNMOS transistor 33 configured such that the drain current may be adjusted and configured as a transistor capable of adjusting the current flowing through the connection point P2 by adjusting the drain current.

Figure 6:
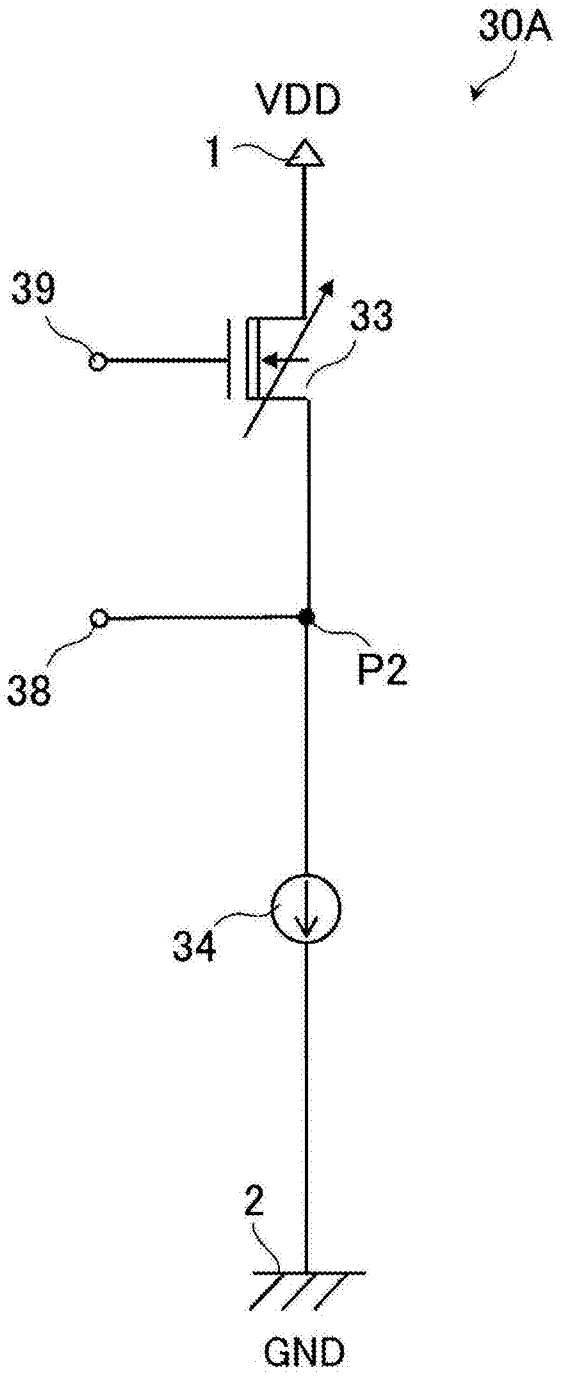
FIG. 6 is a circuit diagram illustrating a second configuration example of a current adjustment circuit in the voltage lowering circuit of the current compensation circuit and semiconductor device according to the second embodiment.

FIG. 6 is a circuit diagram illustrating a configuration example of a voltage lowering circuit 30A which is another example of the voltage lowering circuit in the current compensation circuit and the semiconductor device according to the second embodiment.

Compared to the voltage lowering circuit 30, the voltage lowering circuit 30A exemplified in FIG. 6 is configured to have the DNMOS transistor 33 capable of adjusting the current flowing through the connection point P2 instead of the DNMOS transistor 31, and a constant current source 34 instead of the current adjustment circuit 32.

It should be noted that the voltage lowering circuit described above may be configured to be capable of adjusting the current flowing through the connection point P2, and may be configured to include both the DNMOS transistor 33 and the current adjustment circuit 32. In a voltage lowering circuit including the DNMOS transistor 33 and the current adjustment circuit 32, if one of the DNMOS transistor 33 and the current adjustment circuit 32 is configured to be adjustable in the current increase direction and the other in the decrease direction, the increase and decrease adjustment of the current flowing through the connection point P2 can be facilitated.

Furthermore, if one of the DNMOS transistor 33 and the current adjustment circuit 32 is configured to be capable of adjusting the current value more finely than the other, one may be used for fine adjustment and the other for coarse adjustment. In the case where one of the DNMOS transistor 33 and the current adjustment circuit 32 is configured to be capable of fine adjustment and the other capable of coarse adjustment, the range of size ratio required for the elements to add the current value adjustment function can be suppressed, and consequently, the increase in the area of the current compensation circuit 200 and the semiconductor device 20 can be minimized.

These embodiments and their modifications are included in the scope and essence of the present invention, as well as within the scope of the inventions described in the patent claims and their equivalents.

What is claimed is:

1. A current compensation circuit configured to supply current to an emitter of a first bipolar transistor including a collector connected to a first power terminal, a base connected to the first power terminal, and the emitter, the current compensation circuit comprising:

a second bipolar transistor including a collector connected to the first power terminal, a base, and an emitter, the second bipolar transistor being configured to have a same process variation as the first bipolar transistor;

a first transistor including a drain connected to the emitter of the second bipolar transistor, a gate, and a source connected to a second power terminal;

a second transistor including a gate connected to the gate of the first transistor, a drain connected to the gate of the second transistor, and a source connected to the second power terminal;

a third transistor including a drain connected to the emitter of the first bipolar transistor, a gate connected to a connection point of the drain of the second transistor, the gate of the second transistor, and the gate of the first transistor, and a source connected to the second power terminal;

a constant current source including a first end connected to the connection point and a second end connected to the first power terminal;

a fourth transistor including a drain connected to the base of the second bipolar transistor, a source connected to the first power terminal, and a gate connected to the drain of the fourth transistor; and a fifth transistor including a drain connected to the first end of the constant current source, a gate connected to the gate of the fourth transistor, and a source connected to the first power terminal.

2. The current compensation circuit according to claim 1, further comprising:

a voltage lowering circuit including a first end connected to the gate of the fourth transistor and a second end connected to the drain of the fourth transistor, the voltage lowering circuit adjusting a voltage of the second end of the voltage lowering circuit to be equal to or lower than a voltage of the gate of the fourth transistor.

3. The current compensation circuit according to claim 2, wherein the voltage lowering circuit includes:

any one of a depletion-type transistor among a first depletion-type transistor including a drain connected to the second power terminal, a gate connected to the second end of the voltage lowering circuit, and a source connected to the first end of the voltage lowering circuit and a back gate of the first depletion-type transistor, and a second depletion-type transistor including a drain connected to the second power terminal, a gate connected to the second end of the voltage lowering circuit, and a source connected to the first end of the voltage lowering circuit and a back gate of the second depletion-type transistor, the second depletion-type transistor being configured to adjust drain current of the second depletion-type transistor; and a current adjustment circuit including a first end connected to a second connection point connecting the back gate and the source of the any one depletion-type transistor and the first end of the voltage lowering circuit, and a second end connected to the first power terminal, the current adjustment circuit being configured to adjust a current value flowing through the second connection point.

4. The current compensation circuit according to claim 2, wherein the voltage lowering circuit includes:

a depletion-type transistor including a drain connected to the second power terminal, a gate connected to the second end of the voltage lowering circuit, and a source connected to the first end of the voltage lowering circuit and a back gate of the depletion-type transistor, the depletion-type transistor being configured to adjust drain current of the depletion-type transistor; and a constant current source including a first end connected to a second connection point connecting the back gate and the source of the depletion-type transistor and the first end of the voltage lowering circuit, and a second end connected to the first power terminal, the constant current source being configured to supply a constant current.

5. The current compensation circuit according to claim 1, further comprising:

a switch configured to connect the first end of the constant current source and the drain of the fifth transistor in an openable and closable manner.

6. The current compensation circuit according to claim 2, further comprising:

a switch configured to connect the first end of the constant current source and the drain of the fifth transistor in an openable and closable manner.

7. The current compensation circuit according to claim 3, further comprising:

a switch configured to connect the first end of the constant current source and the drain of the fifth transistor in an openable and closable manner.

8. The current compensation circuit according to claim 4, further comprising:

a switch configured to connect the first end of the constant current source and the drain of the fifth transistor in an openable and closable manner.

9. A semiconductor device including an integrated circuit formed on a semiconductor substrate, the integrated circuit comprising:

a first bipolar transistor including a collector connected to a first power terminal, a base connected to the first power terminal, and an emitter; and a current compensation circuit supplying current to the emitter of the first bipolar transistor, the current compensation circuit comprising:

a second bipolar transistor including a collector connected to the first power terminal, a base, and an emitter, the second bipolar transistor being configured to have a same process variation as the first bipolar transistor;

a first transistor including a drain connected to the emitter of the second bipolar transistor, a gate, and a source connected to a second power terminal;

a second transistor including a gate connected to the gate of the first transistor, a drain connected to the gate of the second transistor, and a source connected to the second power terminal;

a third transistor including a drain connected to the emitter of the first bipolar transistor, a gate connected to a connection point of the drain of the second transistor, the gate of the second transistor, and the gate of the first transistor, and a source connected to the second power terminal;

a constant current source including a first end connected to the connection point and a second end connected to the first power terminal;

a fourth transistor including a drain connected to the base of the second bipolar transistor, a source connected to the first power terminal, and a gate connected to the drain of the fourth transistor; and a fifth transistor including a drain connected to the first end of the constant current source, a gate connected to the gate of the fourth transistor, and a source connected to the first power terminal.

10. The semiconductor device according to claim 9, further comprising:

a voltage lowering circuit including a first end connected to the gate of the fourth transistor and a second end connected to the drain of the fourth transistor, the voltage lowering circuit adjusting a voltage of the second end of the voltage lowering circuit to be equal to or less than a voltage of the gate of the fourth transistor.

11. The semiconductor device according to claim 9, further comprising a voltage lowering circuit, the voltage lowering circuit including:

any one of a depletion-type transistor among a first depletion-type transistor including a drain connected to the second power terminal, a gate connected to the second end of the voltage lowering circuit, and a source connected to the first end of the voltage lowering circuit and a back gate of the first depletion-type transistor, and a second depletion-type transistor including a drain connected to the second power terminal, a gate connected to the second end of the voltage lowering circuit, and a source connected to the first end of the voltage lowering circuit and a back gate of the second depletion-type transistor, the second depletion-type transistor being configured to adjust drain current of the second depletion-type transistor; and a current adjustment circuit including a first end connected to a second connection point connecting the back gate and the source of the any one depletion-type transistor and the first end of the voltage lowering circuit, and a second end connected to the first power terminal, the current adjustment circuit being configured to adjust a current value flowing through the second connection point.

12. The semiconductor device according to claim 9, further comprising a voltage lowering circuit, the voltage lowering circuit including:

a depletion-type transistor including a drain connected to the second power terminal, a gate connected to the second end of the voltage lowering circuit, and a source connected to the first end of the voltage lowering circuit and a back gate of the depletion-type transistor, the depletion-type transistor being configured to adjust drain current of the depletion-type transistor; and a constant current source including a first end connected to a second connection point connecting the back gate and the source of the depletion-type transistor and the first end of the voltage lowering circuit, and a second end connected to the first power terminal, the constant current source being configured to supply a constant current.

13. The semiconductor device according to claim 9, further comprising:

a switch configured to connect the first end of the constant current source and the drain of the fifth transistor in an openable and closable manner.

14. The semiconductor device according to claim 10, further comprising:

a switch configured to connect the first end of the constant current source and the drain of the fifth transistor in an openable and closable manner.

15. The semiconductor device according to claim 11, further comprising:

a switch configured to connect the first end of the constant current source and the drain of the fifth transistor in an openable and closable manner.

16. The semiconductor device according to claim 12, further comprising:

a switch configured to connect the first end of the constant current source and the drain of the fifth transistor in an openable and closable manner.

* * * * *